United States Patent
Xie et al.

(10) Patent No.: US 8,031,573 B1
(45) Date of Patent: Oct. 4, 2011

(54) SUPPLEMENTARY TIMING RECOVERY

(75) Inventors: Jin Xie, Longmont, CO (US); Mats Oberg, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/767,393

(22) Filed: Apr. 26, 2010

Related U.S. Application Data

(60) Provisional application No. 61/174,744, filed on May 1, 2009.

(51) Int. Cl.
*G11B 7/0045* (2006.01)
(52) U.S. Cl. .................. 369/59.2; 369/59.19; 369/59.21
(58) Field of Classification Search ........................ None
See application file for complete search history.

(56) References Cited

U.S. PATENT DOCUMENTS

| | | | |
|---|---|---|---|
| 6,295,316 B1 * | 9/2001 | Tonami et al. | 375/230 |
| 6,603,368 B1 * | 8/2003 | Leahy et al. | 332/100 |
| 6,614,841 B1 * | 9/2003 | Ohta | 375/232 |
| 7,400,561 B2 * | 7/2008 | Serrano et al. | 369/47.28 |
| 7,525,460 B1 | 4/2009 | Liu et al. | |
| 2004/0027948 A1 * | 2/2004 | Tonami | 369/47.35 |
| 2006/0028923 A1 * | 2/2006 | Verschuren et al. | 369/13.01 |
| 2007/0025224 A1 * | 2/2007 | Tatsuzawa et al. | 369/59.22 |

OTHER PUBLICATIONS

Mueller et al, "Timing Recovery in Digital Synchronous Data Receivers," *IEEE Transactions on Communications*, vol. Com-24-No. 5, May 1976.
Shafiee, "Timing Recovery for Sampling Detectors in Digital Magnetic Recording," *IEEE*, 1996.

* cited by examiner

*Primary Examiner* — Peter Vincent Agustin

(57) ABSTRACT

Aspects of the disclosure provide a signal processing circuit to reconstruct data from an analog signal. The signal processing circuit includes an analog to digital converter (ADC), an equalizer, a first timing compensation module, a phase-shift module and a second timing compensation module. The ADC receives an analog input signal, samples the analog input signal based on a sampling clock signal, and converts the sampled analog input signal into a digital output signal. The equalizer equalizes the digital output signal. The first timing compensation module detects a first timing error based on the digital output signal, and adjusts the sampling clock signal based on the first timing error. The phase-shift module phase-shifts the equalized digital output signal based on a phase-shift signal. The second timing compensation module detects a second timing error based on the equalized digital output signal, and adjusts the phase-shift signal based on the second timing error.

20 Claims, 8 Drawing Sheets

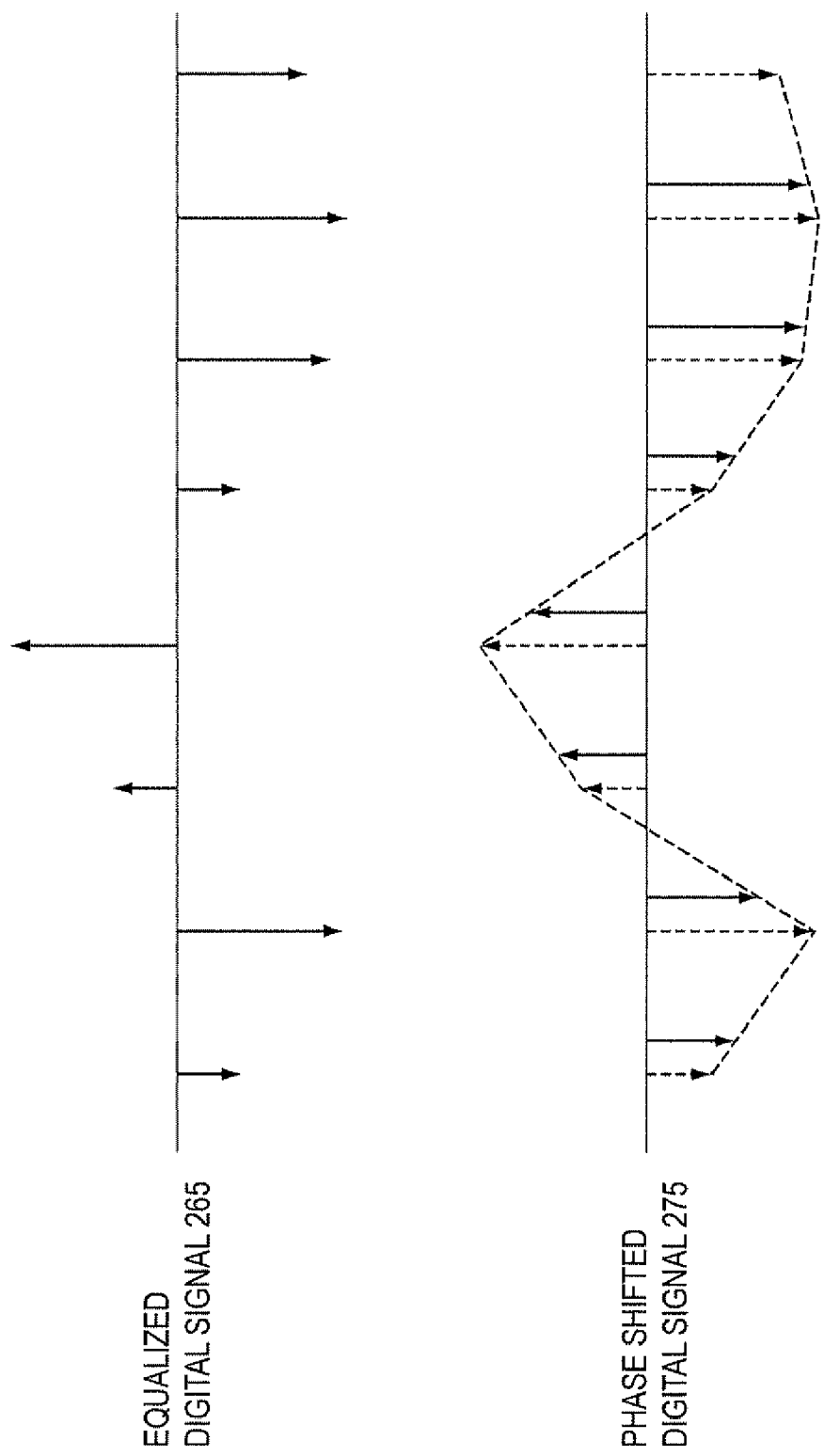

SUPPLEMENTARY TIMING RECOVERY

INCORPORATION BY REFERENCE

This application claims the benefit of U.S. Provisional Application No. 61/174,744, "Supplementary Timing Recovery" filed on May 1, 2009, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Timing recovery techniques are used in electrical devices, such as communication devices, storage devices, and the like, to recover digital data from electrical signals. In an example, an optical storage device includes a data read channel that receives an electrical signal corresponding to data stored on an optical storage medium. The data read channel can include a timing recovery circuit to generate a timing signal based on the electrical signal. The timing signal is used to sample the electrical signal to reconstruct the digital data stored on the optical storage medium.

SUMMARY

Aspects of the disclosure can provide a signal processing circuit to reconstruct data from an analog signal. The signal processing circuit includes an analog to digital converter (ADC), an equalizer, a first timing compensation module, a phase-shift module and a second timing compensation module. The ADC is configured to receive an analog input signal, sample the analog input signal based on a sampling clock signal, and convert the sampled analog input signal into a digital output signal. The equalizer is configured to equalize the digital output signal. The first timing compensation module is configured to detect a first timing error based on the digital output signal, and to adjust the sampling clock signal based on the first timing error. The phase-shift module is configured to phase-shift the equalized digital output signal based on a phase-shift signal. The second timing compensation module is configured to detect a second timing error based on the equalized digital output signal, and to adjust the phase-shift signal based on the second timing error. It is noted that the second timing error can be detected based on the equalized digital output signal, and can be detected based on further processed equalized digital output signal.

Further, the first timing compensation module includes a first timing error detector configured to detect the first timing error based on the digital output signal, a first loop filter configured to generate a first feedback signal based on the first timing error, and a first voltage controlled oscillator configured to generate the sampling clock signal based on the first feedback signal to correct the first timing error.

In an embodiment, the first timing error detector is configured to detect the first timing error based on the digital output signal at a zero-crossing when the digital output signal transits from a first polarity to a second polarity, such as from positive polarity to negative polarity, or from negative polarity to positive polarity. Specifically, the first timing error detector includes a zero-crossing detector configured to detect the zero-crossing of the digital output signal, a polarity detector configured to detect a slope polarity of the digital output signal at the zero-crossing, and a first timing error generator configured to generate the first timing error by combining the digital output signal at the zero-crossing and the slope polarity.

According to an aspect of the disclosure, the second timing compensation module includes a second timing error detector configured to detect the second timing error based on a difference between the phase-shifted equalized digital output signal and a target output corresponding to a bit sequence of the phase-shifted equalized digital output signal. Specifically, the second timing error detector includes a bit detector configured to detect the bit sequence corresponding to the phase-shifted equalized digital output signal, a target module configured to generate the target output based on the bit sequence, and a second timing error generator configured to compute the difference between the phase-shifted equalized digital output signal and the target output.

Further, the second timing compensation module includes a second loop filter configured to generate a second feedback signal based on the second timing error, and a second voltage controlled oscillator configured to generate the phase-shift signal based on the second feedback signal.

Aspects of the disclosure can provide a method for signal processing. The method includes receiving an analog input signal corresponding to data stored in a non-transitory computer readable medium, sampling the analog input signal and converting the sampled analog input signal into a digital output signal based on a sampling clock signal, equalizing the digital output signal, generating a first timing error signal based on the digital output signal before equalizing, adjusting the sampling clock signal based on the first timing error to compensate for the first timing error, generating a second timing error based on the equalized digital output signal, and phase-shifting the equalized digital output signal based on the second timing error. Further, the method includes phase-locking the sampling clock signal based on the first timing error to compensate for the first timing error. It is noted that the second timing error can be generated based on the equalized digital output signal, and can be generated based on further processed equalized digital output signal.

To generate the first timing error signal based on the digital output signal, the method includes generating the first timing error signal based on the digital output signal at a zero-crossing when the digital output signal transits from a first polarity to a second polarity, such as from positive polarity to negative polarity, or from negative polarity to positive polarity.

To generate the first timing error signal based on the digital output signal at the zero-crossing when the digital output signal transits from the first polarity to the second polarity, the method includes detecting a bit sequence from the digital output signal, determining the zero-crossing based on the bit sequence, determining a slope polarity at the zero-crossing, and combining a value of the digital output signal at the zero-crossing and the slope polarity to generate the first timing error.

To generate the second timing error based on the digital output signal after equalizing, the method includes generating the second timing error based on the phase-shifted equalized digital output signal, and phase-locking a phase-shift value based on the second timing error to compensate for the second timing error. Further, the method includes detecting a bit sequence corresponding to the equalized digital output signal, computing a target signal corresponding to the bit sequence, and calculating a difference between the equalized digital output signal and the target signal.

Aspects of the disclosure can also provide an apparatus for reading a non-transitory optical medium. The apparatus includes an optical pick-up unit configured to generate an electrical signal corresponding to data stored in the non-transitory optical medium, an analog signal processing path to generate an analog input signal based on the electrical signal, and the signal processing circuit to reconstruct data from the analog signal.

BRIEF DESCRIPTION OF THE DRAWINGS

Various embodiments of this disclosure that are proposed as examples will be described in detail with reference to the following figures, wherein like numerals reference like elements, and wherein:

FIG. 4B shows an example of inputs and outputs for a phase shift module 470 according to an embodiment of the disclosure.

DETAILED DESCRIPTION OF EMBODIMENTS

Figure 1:
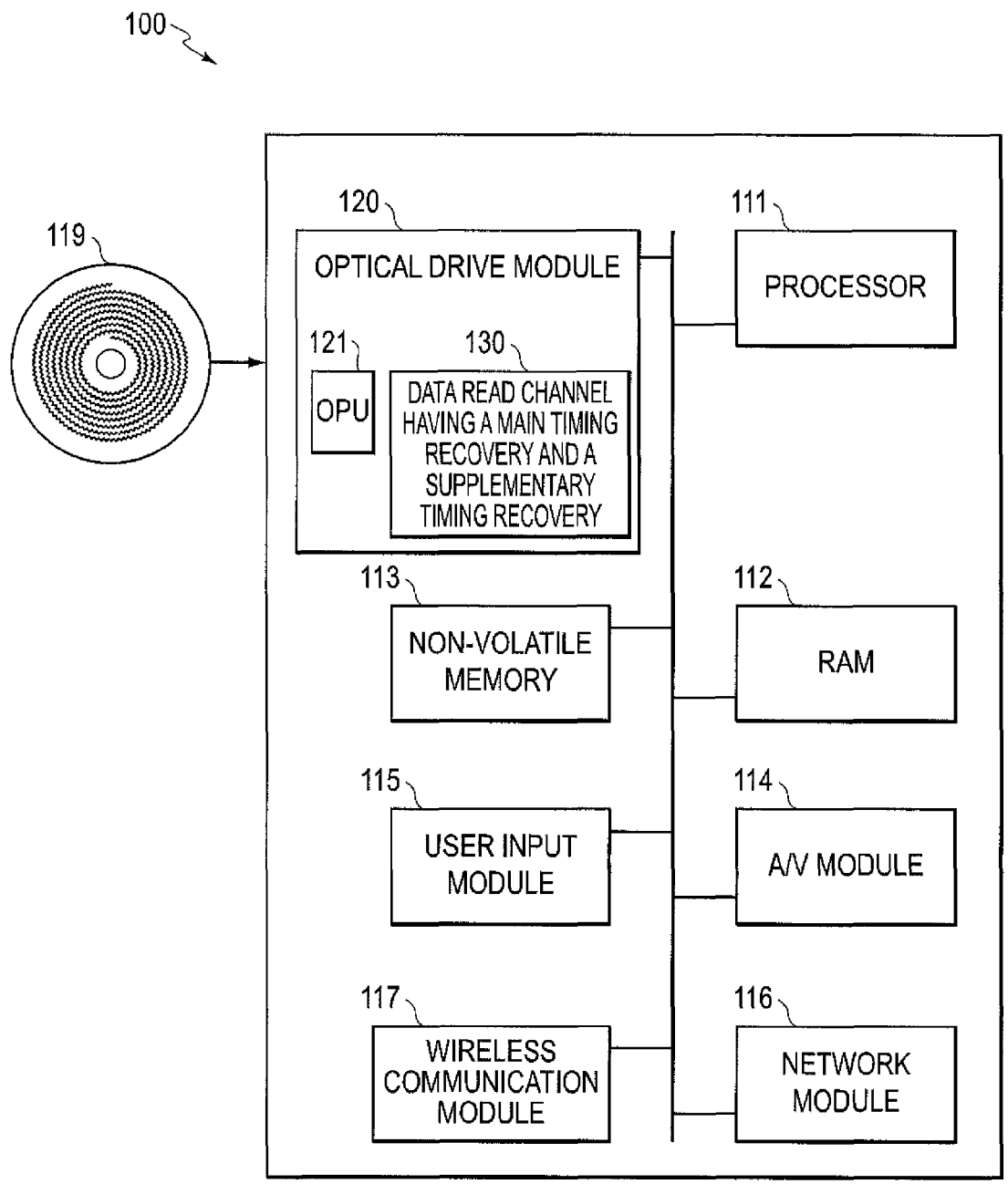
FIG. 1 shows a block diagram of a medium system example 100 and an optical disc example 119 according to an embodiment of the disclosure.

FIG. 1 shows a block diagram of a medium system example 100 and an optical disc example 119 according to an embodiment of the disclosure. The medium system 100 includes a processor module 111, an optical drive module 120, random access memory (RAM) 112, and non-volatile memory 113. These elements are coupled together as shown in FIG. 1.

The optical drive module 120 includes an optical pickup unit (OPU) 121, and a data read channel 130. The OPU 121 is configured to generate an electrical signal in response to data stored on the optical disc 119. Specifically, the OPU 121 directs a laser beam to a location of the optical disc 119. The laser beam is reflected from the location of the optical disc 119. The reflected laser beam has light properties that correspond to data stored at the location of the optical disc 119. The light properties can be detected by a light detector (not shown) of the OPU 121. The light detector of the OPU 121 generates an electrical signal, generally in the analog form, in response to the reflected laser beam. The electrical signal is then processed by other components of the optical drive module 120, such as the data read channel 130, to reproduce the data stored on the optical disc 119.

The data read channel 130 includes a signal processing circuit (not shown). The signal processing circuit receives the electrical signal, processes the electrical signal, and reconstructs data from the electrical signal. Generally, the signal processing circuit has a timing recovery function that obtains a data timing from the electrical signal. The data timing is used to reconstruct the data from the electrical signal. The accuracy of the reconstructed data can be affected by the data timing. The timing recovery function improves the data timing by correcting a timing error between the data timing and the electrical signal. In an example, the timing recovery function aligns a sampling clock to a desired data phase, such as a zero-crossing, and the like, in the electrical signal.

According to the disclosure, the signal processing circuit of the data read channel 130 includes a main timing recovery function and a supplementary timing recovery function. In an embodiment, the main timing recovery function detects a first timing error with a relatively fast response. The supplementary timing recovery function detects a second timing error with a relatively high accuracy. The second timing error is a leftover timing error from the main timing recovery function. Further, based on timing error correction of the first timing error and the second timing error, data reconstruction from the electrical signal is performed. Thus, the data reconstruction from the electrical signal can have the relatively fast response and the relatively high accuracy.

In an example, the data read channel 130 includes an equalizer in the signal processing circuit (not shown). The equalizer equalizes the electrical signal, for example, to reduce noises and control inter-symbol interferences, and thus improves data reconstruction accuracy. However, the equalizer introduces delays for processing the electrical signal. According to an embodiment of the disclosure, the main timing recovery function detects the first timing error based on the electrical signal before the electrical signal is processed by the equalizer, and the supplementary timing recovery function detects the second timing error based on the electrical signal after the electrical signal is processed by the equalizer. Thus, the first timing error is detected with a relatively fast response, and the second timing error is detected with a relatively high accuracy. Then, based on timing error correction of the first timing error and the second timing error, data reconstruction is performed. Thus, the data reconstruction can have the relatively fast response and the relatively high accuracy.

The processor module 111 executes system and application codes. The non-volatile memory unit 113 holds information even when power is off. The non-volatile memory unit 113 can be used to store system and application codes, such as firmware. The RAM unit 112 is readable and writeable. Generally, the RAM unit 112 can have a relatively fast access speed. In an embodiment, the data and the codes are stored in the RAM unit 112 during operation, such that the processor module 111 can access the RAM unit 112 for the codes and the data instead of the non-volatile memory 113.

It should be understood that the medium system 100 can include more than one processor module 111. Further, the non-volatile memory unit 113 can include various non-volatile memory devices, such as battery backup RAM, read-only memory (ROM), programmable ROM (PROM), flash PROM, electrical erasable PROM (EEPROM) magnetic storage, optical storage, and the like. Some non-volatile memory 113 can be updated, such as various types of PROM. The RAM unit 112 may also include various RAM devices, such as dynamic RAM (DRAM), static RAM (SRAM), and the like.

It is noted that the medium system 100 can include other suitable modules. In an example, the medium system 100 includes a user input module 115. The user input module 115 enables a user to control operations of the medium system 100. The user input module 115 includes any suitable user input device, such as a keyboard, mouse, touch screen, and the like. In addition, the user input module 115 can include an interface that couples external user input devices to the medium system 100.

In another example, the medium system 100 includes an audio/video (A/V) module 114. The audio/video module 114 includes any suitable audio/video device, such as a microphone, speaker, display screen, and the like. In addition, the audio/video module 114 can include an interface that couples external audio and video devices to the medium system 100. The audio/video module 114 can be utilized to play audio/video data stored in the optical disc 119.

In another example, the medium system 100 includes communication modules, such as a network module 116, a wireless communication module 117, and the like. The network module 116 and the wireless communication module 117 enable the medium system 100 to transmit the data stored on the optical disc 119 to other devices, or to store data received from the other devices onto the optical disc 119.

For ease and clarity of description, the embodiments are presented with a bus architecture. However, it should be understood that any other architectures can be used to couple components within the medium system 100.

Figure 2A:
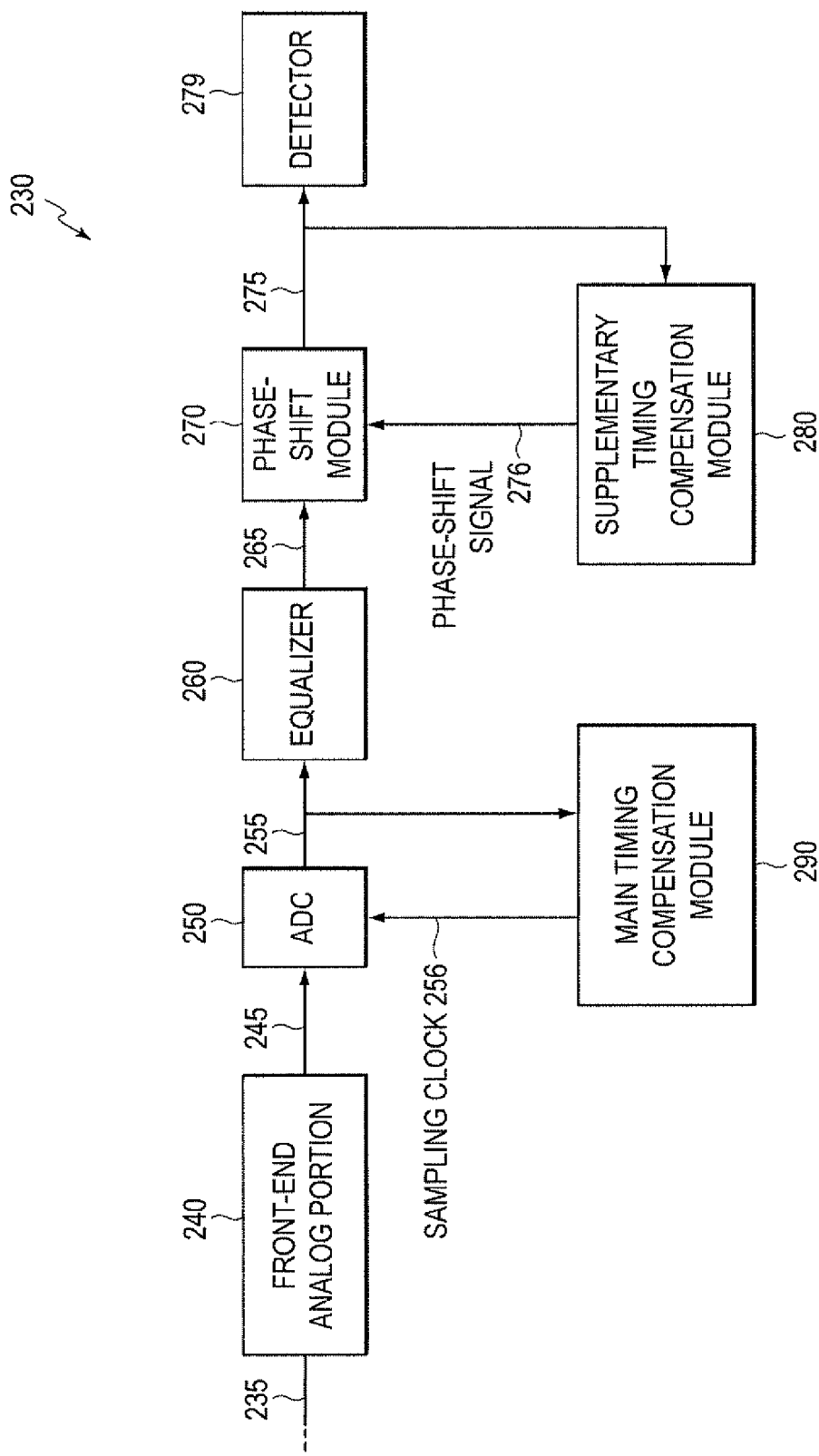
FIG. 2A shows a block diagram of a data read channel example 230 according to an embodiment of the disclosure.

FIG. 2A shows a block diagram of a data read channel example 230 according to an embodiment of the disclosure. The data read channel 230 includes a front-end analog portion 240, an analog to digital converter module (ADC) 250, an equalizer 260, a phase-shift module 270, a detector module 279, a main timing compensation module 290, and a supplementary timing compensation module 280. These elements can be coupled together as shown in FIG. 2A.

The front-end analog portion 240 receives an electrical signal 235, regulates the electrical signal, and outputs an analog data signal 245. The front-end analog portion 240 regulates the electrical signal 235 using analog techniques, such as amplification, compensation for offsets, adjusting an appropriate dynamic range, and the like. In an example, the front-end analog portion 240 includes an offset loop that adjusts offsets of the electrical signal 235. In another example, the front-end analog portion 240 includes a gain loop that adjusts an amplifier gain to regulate the electrical signal 235 to an appropriate dynamic range. Thus, the analog data signal 245 is suitable for subsequent circuit components to handle.

The ADC 250 receives the analog data signal 245 and samples the analog data signal 245 based on a sampling clock 256. In an embodiment, the sampling clock 256 is provided by the main timing compensation module 290. Further, the ADC 250 converts the sampled data signal into a digital signal 255.

The equalizer 260 receives the digital signal 255, equalizes the digital signal 255 to a desired target response, and provides an equalized digital signal to the phase-shift module 270. In an embodiment, the equalizer 260 is a finite impulse response (FIR) digital filter that can be programmable or adaptive. The FIR digital filter 260 is configured to remove noises from the digital signal 255 and control inter-symbol interferences. Thus, data reconstruction based on the equalized digital signal 265 has a relatively high accuracy. However, the FIR digital filter 260 introduces delays.

The phase-shift module 270 receives the equalized digital signal 265, phase-shifts the equalized digital signal 265 based on a phase-shift signal 276 from the supplementary timing compensation module 280, and provides a phase-shifted digital signal 275 to the detector module 279. The detector module 279 reconstructs the data from the phase-shifted digital signal 275. In an embodiment, the detector module 279 is a Viterbi detector. The Viterbi detector 279 detects a bit sequence, such as a binary sequence, multi-level bit sequence, and the like, from the phase-shifted digital signal 275.

The main timing compensation module 290 detects a first timing error based on an electrical signal before being process by the equalizer 260, such as the digital signal 255, and the like. Then, based on the first timing error, the main timing compensation module 290 adjusts the sampling clock 256. In an embodiment, the sampling clock 256 is aligned to a zero-crossing (data eye close position) in the analog signal 245. In the FIG. 2A example, the main timing compensation module 290 and the ADC 250 form a first phase-locked loop. The first phase-locked loop is configured to achieve a target value of the first timing error, such as substantially zero. Due to the reason that the first phase-locked loop does not depend on the equalizer 260, the first phase-locked loop has a relatively short loop delay. Thus, the first timing error can be corrected with a relatively fast response.

In an embodiment, the main timing compensation module 290 detects the first timing error based on sampled values. In an example, the ADC 250 is configured to sample the analog signal 245 at about zero-crossing per bit interval. Due to timing error, the sampling time is off the zero-crossing, and the sampled value is not zero. The ADC 250 generates a signed 6-bit digital value corresponding to each sample. Based on the signed 6-bit digital values, the main timing compensation module 290 detects bits. For example, when a signed 6-bit digital value is positive, the main timing compensation module 290 determines that the corresponding bit is 1; and when a signed 6-bit digital value is negative, the main timing compensation module 290 determines that the corresponding bit is −1. Further, the main timing compensation module 290 determines zero-crossings by detecting transitions between neighboring bits. For example, when two neighboring bits are (1,1) or (−1,−1), the main timing compensation module 290 determines no zero-crossing happens. However, when the two neighboring bits are (−1,1) or (1,−1), the main timing compensation module 290 detects a zero-crossing between the two samples, for example.

Further, the main timing compensation module 290 detects a slope polarity of the transition at the zero-crossing. Based on the sampled digital value and the detected slope polarity, the main timing compensation module 290 calculates the first timing error.

Figure 2B:
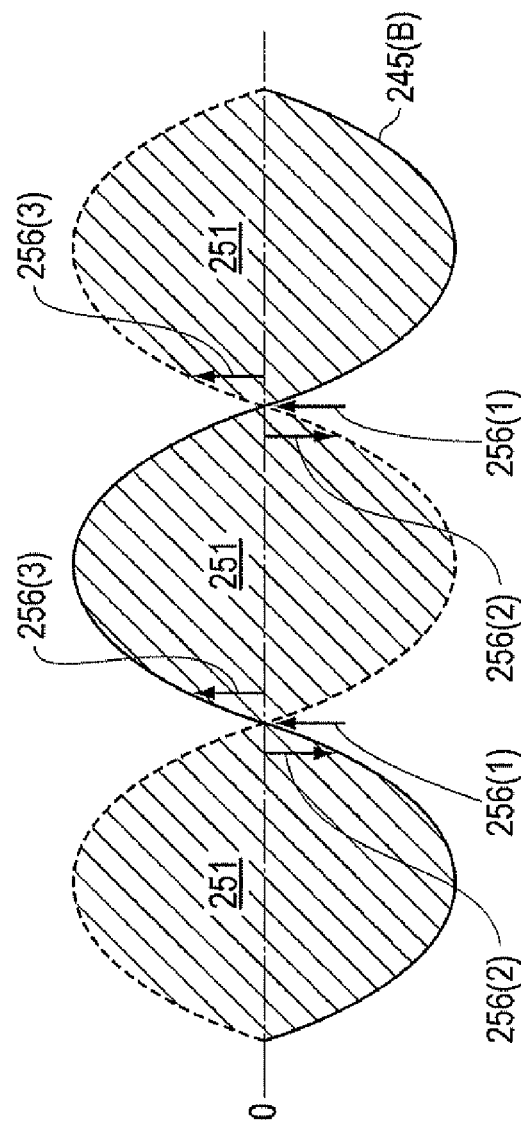
FIG. 2B shows a waveform example 245(B) and data eyes examples 251 according to an embodiment of the disclosure.

FIG. 2B shows a waveform example 245(B) for the analog signal 245, and data eyes examples 251 according to an embodiment of the disclosure. It is noted that when the sampling clock 256 is ideally aligned to zero-crossings (close position of the data eyes) of the analog signal 245, the digital value at the sampling time is substantially zero, such as shown by 256(1) in FIG. 2B. When the sampling clock 256 is earlier than the ideal alignment, the digital value at the sampling time is positive for a falling edge, and is negative for a rising edge, as shown by 256(2) in FIG. 2B. Similarly, when the sampling clock 256 is later than the ideal alignment, the digital value at the sampling time is negative for a falling edge, and is positive for a rising edge, as shown by 256(3) in FIG. 2B. Thus, the first timing error can be represented as a misalignment of the sampling clock 256. Then, the main timing error compensation module 290 calculates the first timing error as a function of the digital value at the sampling time and the slope polarity.

The slope polarity can be determined based on neighboring digital values or determines bits corresponding to the digital values. For example, when the two neighboring bits are (−1, 1), the main timing compensation module 290 determines a rising edge having a positive slope (+1); and when the two neighboring bits are (1,−1), the main timing compensation module 290 determines a falling edge having a negative slope (−1). Then, the main timing compensation module 290 generates the first timing error by suitably combining, such as multiplying, the digital value at the sampling time with the slope polarity.

It is noted that the main timing compensation module 290 can include any suitable circuit to control the sampling clock 256 based on the first timing error in order to correct the first timing error. In an example, the main timing compensation module 290 includes a loop filter and a voltage controlled oscillator to adjust the sampling clock 256 based on the first timing error, which is disclosed in detail with reference to FIG. 3A.

The supplementary timing compensation module 280 detects a second timing error based on an electrical signal after being processed by the equalizer 260, such as the equalized digital signal 265, the phase-shifted digital signal 275, and the like. The second timing error is a leftover timing error from the main timing error compensation module 290. Then, based on the second timing error, the supplementary timing compensation module 280 provides the phase-shift signal 276 to the phase-shift module 270 to suitably correct the second timing error.

In the FIG. 2A example, the phase-shifted module 270 and the supplementary timing compensation module 280 form a second phase-locked loop. The second phase-locked loop is configured to achieve a target value of the second timing error, such as substantially zero. Due to the reason that the equalizer 260 suitably removes noises and controls inter-symbol interferences, the second timing error is calculated with a relatively high accuracy.

In an embodiment, the supplementary timing compensation module 280 generates the second timing error based on zero-crossings as well as non-zero crossings. In an example, the supplementary timing compensation module 280 detects a bit sequence from the phase-shifted digital signal 275. Based on the bit sequence, the supplementary timing compensation module 280 generates an ideal digital signal. In an example, the ideal digital signal is a noise-free version of the phase-shifted digital signal 275 corresponding to the same bit sequence. Then, the supplementary timing compensation module 280 calculates the second timing error as a function of the phase-shifted digital signal 275 and the ideal digital signal. The supplementary timing compensation module 280 can use any suitable technique to calculate the second timing error, such as minimum mean squared error (MMSE), Mueller and Muller (M&M), and the like.

It is noted that the supplementary timing compensation module 280 can include any suitable circuit to adjust the phase-shift signal 276 based on the second timing error in order to correct the second timing error. In an example, the supplementary timing compensation module 280 includes a loop filter and a voltage controlled oscillator, such as a numerically controlled oscillator (NCO), to adjust the phase-shift signal 276 based on the second timing error, which is disclosed in detail with reference to FIG. 4.

It is also noted that the supplementary timing compensation module 280 can also detect the second timing error based on the equalized digital signal 265, and then provide the detected second timing error to the phase-shift module 270 to correct the second timing error.

Figure 3A:
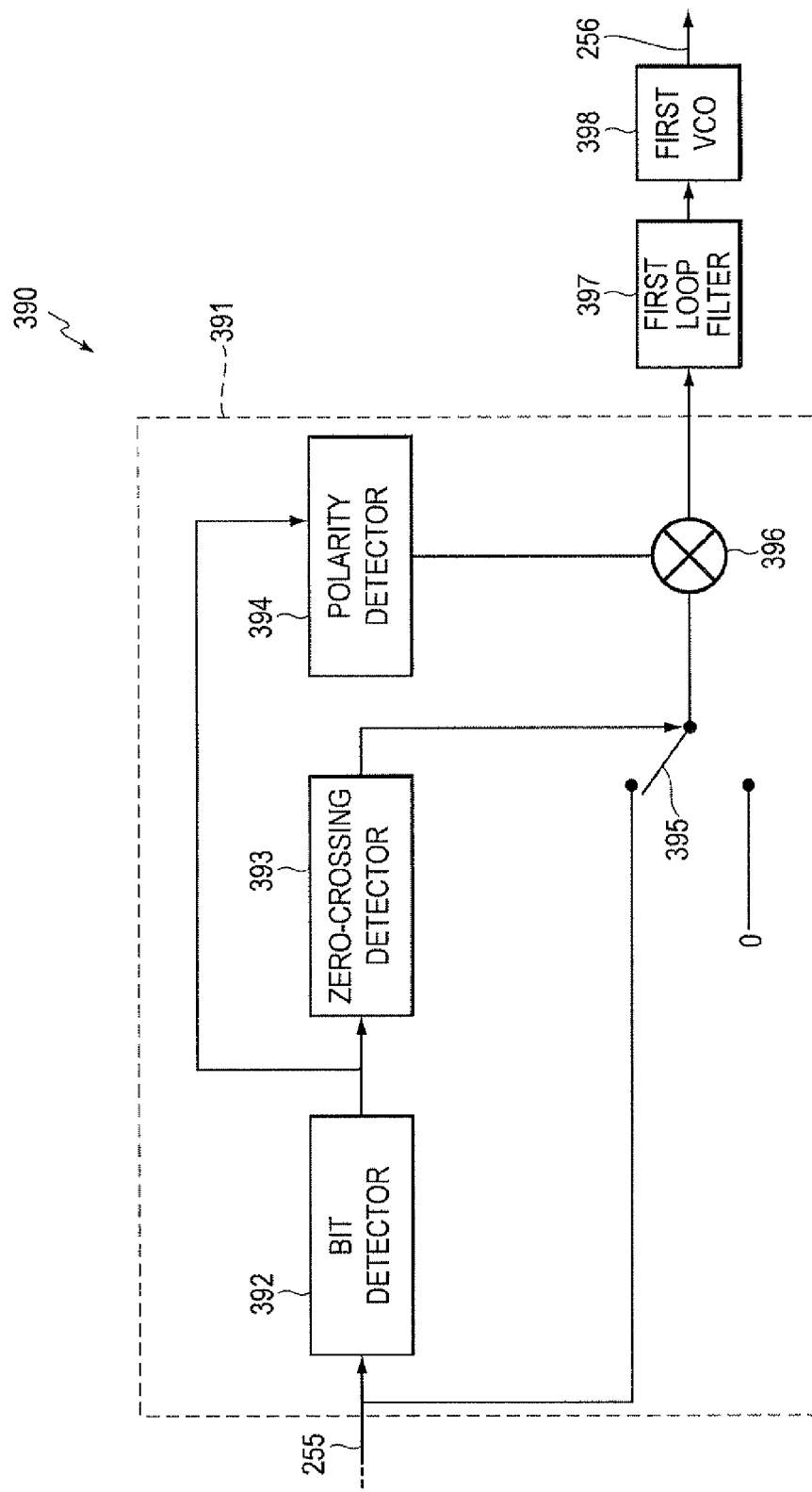
FIG. 3A shows a block diagram of a main timing compensation module 390 according to an embodiment of the disclosure.

FIG. 3A shows a block diagram of a main timing compensation module example 390 according to an embodiment of the disclosure. The main timing compensation module 390 includes a first timing error detector 391, a first loop filter 397, and a first voltage controlled oscillator (VCO) 398. The first timing error detector 391 further includes a bit detector 392, a zero-crossing detector 393, a polarity detector 394, a switch module 395, and a multiplier 396. These elements can be coupled together as shown in FIG. 3A.

The first timing error detector 391 calculates a first timing error based on the digital signal 255 at zero-crossings. The first timing error detector 391 receives, for example, the digital signal 255, detects a zero-crossing of the digital signal 255 and a slope polarity at the zero-crossing, and combines the digital signal 255 at the zero-crossing with the slope polarity to calculate the first timing error.

Specifically, the digital signal 255 includes digital samples of a received analog signal. In an example, the received analog signal is sampled at about zero-crossings, and the sampled analog signal is digitalized to obtain the digital signal 255. Due to timing error, the sampling points are not aligned exactly with the zero-crossings. Further, based on the digital signal 255, the bit detector 392 detects corresponding bits. The bit detector 392 can use any suitable technique to detect the corresponding bits. In an example, when an average of two adjacent samples is positive, the bit detector 392 detects 1, and when the average of two adjacent samples is negative, the bit detector 392 detects −1. In another example, the bit detector 392 compares an average of two adjacent samples with a threshold. When the average of two adjacent samples is larger than the threshold, the bit detector 392 detects 1, and when the average of the two adjacent samples is smaller than the same threshold or a different threshold, the bit detector 392 detects −1. In another example, the bit detector 392 is configured as a Viterbi detector.

Then, based on the detected bits, the zero-crossing detector 393 detects zero-crossings, and the polarity detector 394 detects slope polarities corresponding to the zero-crossings. For example, when the bit detector 392 outputs two neighboring bits (1,1) or (−1,−1), the zero-crossing detector 393 detects no zero-crossing. When the bit detector 392 outputs two neighboring bits (−1,1), the zero detector 393 detects a zero-crossing, and the polarity detector 394 detects a rising edge having a positive slope (+1). Similarly, when the bit detector 392 outputs two neighboring bits (1,−1), the zero detector 393 detects a zero-crossing, and the polarity detector 394 detects a falling edge having a negative slope (−1).

Further, the outputs of the zero-crossing detector 393 control the switch module 395 to selectively direct the digital signal 255 to the multiplier 396 for calculating the first timing error. For example, when the zero-crossing detector 393 detects no zero-crossing, the switch module 395 is controlled to direct zero to the multiplier 396. When the zero-crossing detector 393 detects a zero-crossing, the switch module 395 can suitably direct the digital signal 255 to the multiplier 396.

The multiplier 396 combines the digital value at the zero-crossing with the slope polarity at the zero-crossing to calculate the first timing error.

Figure 3B:
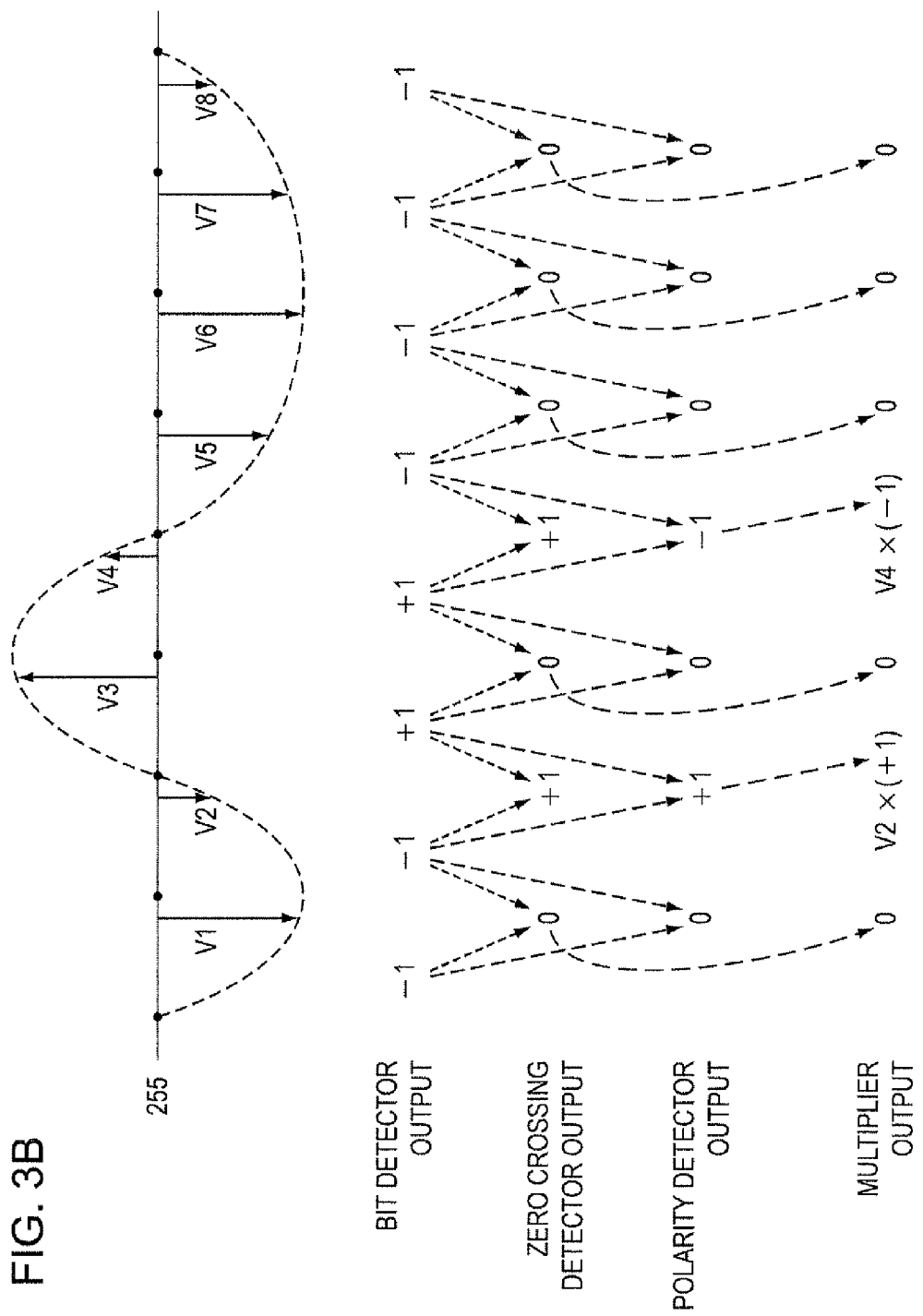
FIG. 3B shows outputs examples of a first timing error detector 391 according to an embodiment of the disclosure.

FIG. 3B shows outputs examples of the bit detector 392, the zero-crossing detector 393, the polarity detector 394 and the multiplier 396 of the first timing error detector 391 according to the embodiment of FIG. 3A.

The first timing error is provided to the first loop filter 397. The first loop filter 397 obtains a feedback portion of the first timing error. The feedback portion is used to control the first VCO 398 to adjust the sampling clock 256.

Figure 4A:
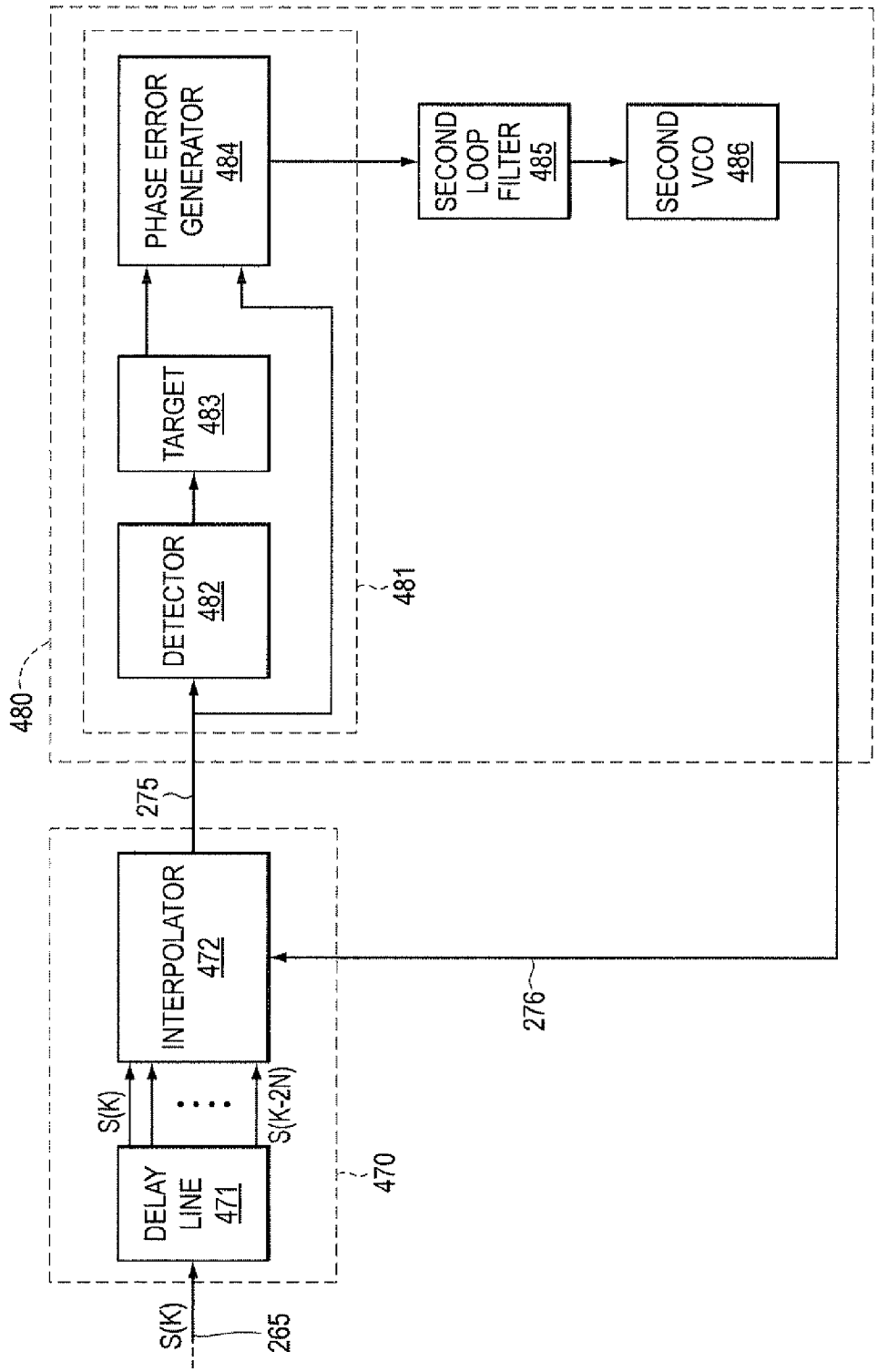
FIG. 4A shows a block diagram of a supplementary timing compensation module 480 according to an embodiment of the disclosure.

FIG. 4A shows a block diagram of a supplementary timing compensation module example 480 coupled with a phase-shift module 470 in a phase-locked loop according to an embodiment of the disclosure. The supplementary timing compensation module 480 includes a second timing error detector 481, a second loop filter 485, and a second VCO 486. The second timing error detector 481 further includes a detector 482, a target 483, and a phase error generator 484. The phase-shift module 470 includes a delay-line 471 and an interpolator 472. In an example, the second VCO 486 is implemented as a numerically controlled oscillator (NCO) 486. These elements can be coupled together as shown in FIG. 4A.

The delay-line 471 receives the equalized digital signal 265, and suitably delays the equalized digital signal 265. In an example, the delay-line 471 includes 2N delay lines. N is an integer number. The 2N delay lines are configured to respectively delay the equalized digital signal 265 with 0 cycle, 1 cycle, 2 cycles, 3 cycles, ..., 2N cycles. The interpolator 472 suitably interpolates the delayed signals based on the phase-shift signal 276 to generate the phase-shifted digital signal 275.

In an example, the interpolator 472 generates the phase-shifted digital signal 275 based on Eq. 1:

$$x(k)=s(k-N+M) \times (1-w) + s(k-N+M+1) \times w \quad \text{Eq. 1}$$

where $x(k)$ denotes the phase-shifted digital signal 275, $s(k)$ denotes the equalized digital signal 265, M denotes an integer portion of the phase-shift signal 276, w denotes a positive fraction portion of the phase-shift signal 276, M+w denotes the phase-shift signal 276, $s(k-N+M)$ denotes the equalized digital signal 265 that has been delayed N−M cycles, and $s(k-N+M+1)$ denotes the equalized digital signal 265 that has been delayed N−M−1 cycles.

For example, when $M+w=0$, $x(k)=s(k-N)$ when $M+w=0.1$, $x(k)=s(k-N) \times 0.9 + s(k-N+1) \times 0.1$;

when $M+w=0.7$, $x(k)=s(k-N) \times 0.3 + s(k-N+1) \times 0.7$;

when $M+w=1.2$, $x(k)=s(k-N+1) \times 0.8 + s(k-N+2) \times 0.2$;

when $M+w=-0.3=-1+0.7$, $x(k)=s(k-N-1) \times 0.3 + s(k-N) \times 0.7$; and when $M+w=-2.6=-3+0.4$, $x(k)=s(k-N-3) \times 0.6 + s(k-N-2) \times 0.4$.

FIG. 4B shows an example of the equalized digital signal 265 and the phase-shifted digital signal 275. The phase-shifted digital signal 275 is generated based on interpolation of the equalized digital signal 265.

The detector 482 receives the phase-shifted digital signal 275 and detects a bit sequence based on the phase-shifted digital signal 275. It is noted that the detector 482 can use any suitable technique to detect the bit sequence. In an example, the detector 482 includes a Viterbi detector.

Further, based on the bit sequence, the target 483 reconstructs an ideal signal corresponding to the bit sequence. The ideal signal can be a noise-free version of the phase-shifted digital signal 275. In an embodiment, the target 483 includes an equalization target. The target 483 convolves the bit sequence with the equalization target to generate the ideal signal.

Based on the ideal signal and the phase-shifted digital signal 275, the phase error generator 484 generates a second timing error. It is noted that second timing error can be calculated based on any samples, such as samples corresponding to zero-crossings, as well as samples corresponding to non zero-crossings. The phase error generator 484 can use any suitable technique to calculate the second timing error, such as minimum mean squared error (MMSE), Mueller and Muller (M&M), and the like.

In an embodiment, the second timing error is provided to the second loop filter 485. The second loop filter 485 obtains a feedback portion of the second timing error. The feedback portion is used by the second VCO 486 to generate the phase-shift signal 276. The phase-shift signal 276 is provided to the interpolator 472 to adjust the phase-shift of the interpolator 472 in order to correct the second timing error.

Figure 5:
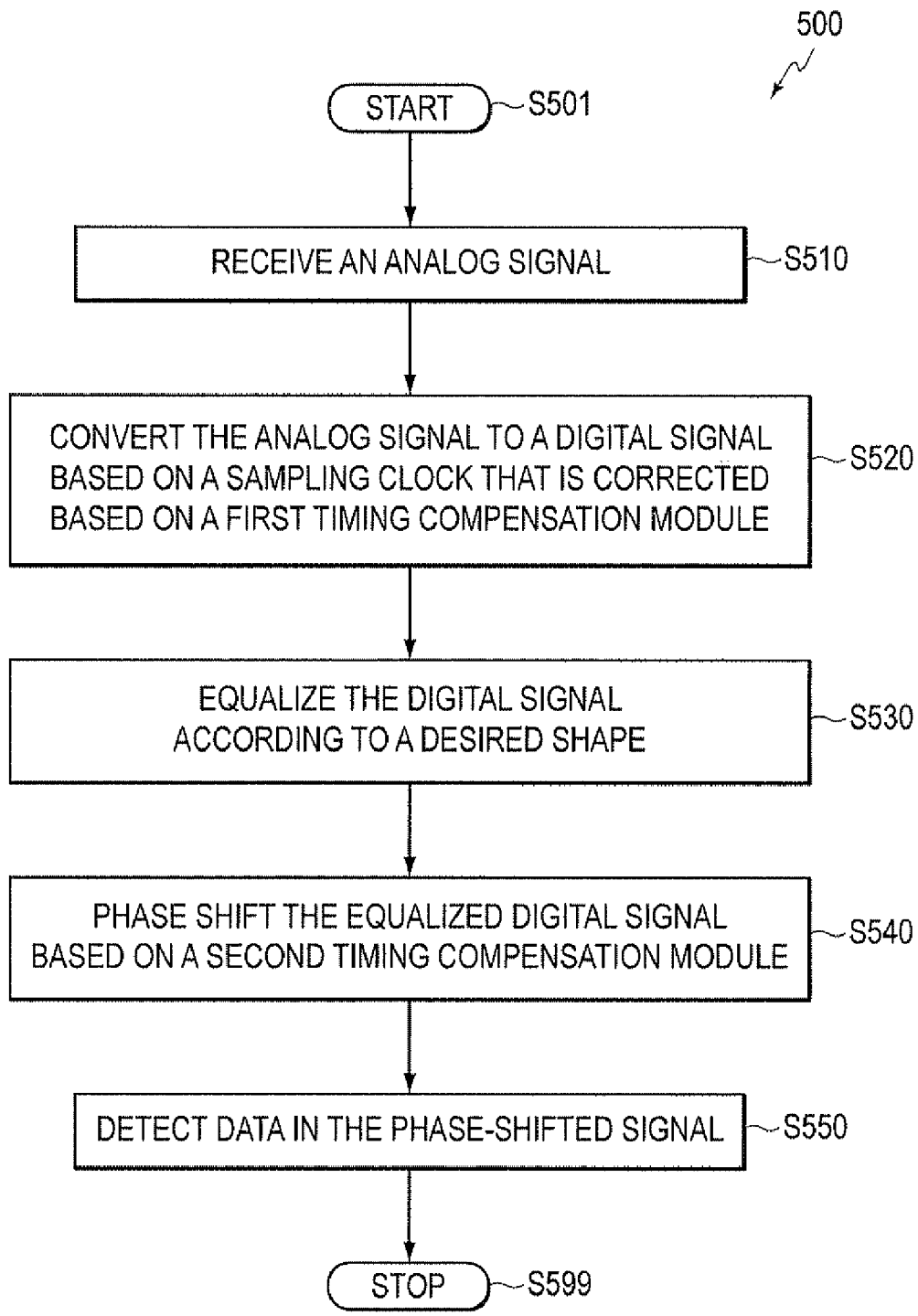
FIG. 5 shows a flow chart outlining a process example 500 of a data read channel to reconstruct data from an analog signal according to an embodiment of the disclosure.

FIG. 5 shows a flowchart outlining a process example 500 for a data read channel to reconstruct data from an analog signal based on a main timing recovery function and a supplementary timing recovery function according to an embodiment of the disclosure. The main timing recovery function corrects timing errors with a relatively fast response. The supplementary timing recovery function calculates a leftover timing error from the main timing recovery function with a relatively high accuracy, and corrects the leftover timing error. The process starts at step S501, and proceeds to step S510.

At step S510, the data read channel receives an analog signal. In an embodiment, the data read channel is coupled to an optical pick-up unit to read data stored on an optical disc. The optical pick-up unit directs a laser beam onto the optical disc. The laser beam is reflected from the optical disc having a light property corresponding to the data stored on the optical disc. In response to the reflected laser beam, the optical pick-up unit generates an analog signal, and provides the analog signal to the data read channel to reconstruct the data stored on the optical disc.

At step S520, the data read channel samples the analog signal based on a sampling clock, and converts the sampled analog signal into a digital signal. The sampling clock is adjusted according to the main timing recovery function to correct a first timing error. In an embodiment, the data read channel includes an analog front-end portion to regulate the analog signal using analog signal processing techniques. Then, the data read channel includes an analog to digital converter (ADC) module coupled with a main timing recovery module in a phase-locked loop. The ADC module samples the analog signal based on the sampling clock, and converts the sampled analog signal into the digital signal. The main timing recovery module calculates the first timing error based on the digital signal, and adjusts the sampling clock to correct the first timing error. The first timing error is calculated with a relatively short delay, for example, without equalizing the digital signal. Thus, the main timing recovery function to correct the first timing error can be performed with a relatively fast response.

At step S530, the data read channel equalizes the digital signal according to a desired target response. In an embodiment, the data read channel includes an equalizer. The equalizer is configured to reduce noises and inter-symbol interferences in the digital signal. However, the equalizer introduces delays. In an example, the equalizer is implemented as a finite impulse response (FIR) digital filter. The FIR digital filter introduces a delay.

At step S540, the data read channel phase-shifts the equalized digital signal based on the supplementary timing recovery function. In an embodiment, the data read channel includes a delay-line module and an interpolator module coupled with a supplementary timing recovery module in a phase-locked loop. The delay-line module includes a plurality of delay lines that are respectively configured to delay the equalized digital signal with specified delays. The interpolator module is configured to interpolate the delayed digital signals from the plurality of delay lines based on a phase-shift signal. The supplementary timing recovery module detects a second timing error based on the phase-shifted digital signal, and adjusts the phase shift signal to correct the second timing error.

The supplementary timing recovery module calculates the second timing error with a relatively high accuracy for various reasons. For example, the equalized digital signal has reduced noises and reduced inter-symbol interferences. In addition, the second timing error can be calculated at zero-crossings as well as non zero-crossings. Thus, by correcting the second timing error, data reconstruction can be performed with an increased accuracy.

At step S550, the data read channel reconstructs data from the phase-shifted digital signal. In an embodiment, the data read channel includes a Viterbi detector to detect a bit sequence from the phase-shifted signal. Then the process proceeds to step S599 and terminates.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A signal processing circuit, comprising:
   an analog to digital converter (ADC) configured to receive an analog input signal, sample the analog input signal based on a sampling clock signal, and convert the sampled analog input signal into a digital output signal;
   an equalizer configured to equalize the digital output signal;
   a first timing compensation module configured to detect a first timing error based on the digital output signal, and to adjust the sampling clock signal based on the first timing error;
   a phase-shift module configured to phase-shift the equalized digital output signal based on a phase-shift signal; and
   a second timing compensation module configured to detect a second timing error based on the equalized digital output signal, and to adjust the phase-shift signal based on the second timing error.

2. The signal processing circuit of claim 1, wherein the first timing compensation module further comprises:
   a first timing error detector configured to detect the first timing error based on the digital output signal;
   a first loop filter configured to generate a first feedback signal based on the first timing error; and
   a first voltage controlled oscillator configured to generate the sampling clock signal based on the first feedback signal to correct the first timing error.

3. The signal processing circuit of claim 2, wherein the first timing error detector is configured to detect the first timing error based on the digital output signal at a zero-crossing when the digital output signal transits from a first polarity to a second polarity.

4. The signal processing circuit of claim 3, wherein the first timing error detector further comprises:
   a zero-crossing detector configured to detect the zero-crossing of the digital output signal;
   a polarity detector configured to detect a slope polarity of the digital output signal at the zero-crossing; and
   a first timing error generator configured to generate the first timing error by combining the digital output signal at the zero-crossing and the slope polarity.

5. The signal processing circuit of claim 1, wherein the second timing compensation module further comprises:
   a second timing error detector configured to detect the second timing error based on a difference between the phase-shifted equalized digital output signal and a target output corresponding to a bit sequence of the phase-shifted equalized digital output signal.

6. The signal processing circuit of claim 5, wherein the second timing error detector further comprises:
   a bit detector configured to detect the bit sequence corresponding to the equalized digital output signal;
   a target module configured to generate the target output based on the bit sequence; and
   a second timing error generator configured to compute the difference between the phase-shifted equalized digital output signal and the target output.

7. The signal processing circuit of claim 5, wherein:
   the second timing error detector configured to detect the second timing error from the phase-shifted equalized digital output signal;
   a second loop filter configured to generate a second feedback signal based on the second timing error; and
   a second voltage controlled oscillator configured to generate the phase-shift signal based on the second feedback signal.

8. A method for signal processing, comprising:
   receiving an analog input signal corresponding to data stored in a non-transitory computer readable medium;
   sampling the analog input signal and converting the sampled analog input signal into a digital output signal based on a sampling clock signal;
   equalizing the digital output signal;
   generating a first timing error signal based on the digital output signal;
   adjusting the sampling clock signal based on the first timing error to compensate for the first timing error;
   generating a second timing error based on the equalized digital output signal; and
   phase-shifting the equalized digital output signal based on the second timing error.

9. The method of claim 8, further comprising:
   phase-locking the sampling clock signal based on the first timing error to compensate for the first timing error.

10. The method of claim 8, wherein generating the first timing error signal based on the digital output signal further comprises:
    generating the first timing error signal based on the digital output signal at a zero-crossing when the digital output signal transits from a first polarity to a second polarity.

11. The method of claim 10, wherein generating the first timing error signal based on the digital output signal at the zero-crossing when the digital output signal transits from the first polarity to the second polarity, further comprises:
    detecting a bit sequence from the digital output signal;
    determining the zero-crossing from the first polarity to the second polarity based on the bit sequence;
    determining a slope polarity at the zero-crossing; and
    combining a value of the digital output signal at the zero-crossing and the slope polarity to generate the first timing error.

12. The method of claim 8, wherein generating the second timing error based on the equalized digital output signal further comprises:
    generating the second timing error based on the phase-shifted equalized digital output signal; and
    phase-locking a phase-shift value based on the second timing error to compensate for the second timing error.

13. The method of claim 8, wherein generating the second timing error based on the equalized digital output signal further comprises:
- detecting a bit sequence corresponding to the equalized digital output signal;
- computing a target signal corresponding to the bit sequence; and
- calculating a difference between the equalized digital output signal and the target signal.

14. An apparatus for reading a non-transitory optical medium, comprising:
- an optical pick-up unit configured to generate a data signal corresponding to data stored on the non-transitory optical medium;
- an analog signal processing path to generate an analog input signal based on the data signal;
- an analog to digital converter (ADC) configured to receive the analog input signal, sample the analog input signal based on a sampling clock signal, and convert the sampled analog input signal into a digital output signal;
- an equalizer configured to equalize the digital output signal;
- a first timing compensation module configured to detect a first timing error based on the digital output signal, and to adjust the sampling clock signal based on the first timing error;
- a phase-shift module configured to phase-shift the equalized digital output signal based on a phase-shift signal; and
- a second timing compensation module configured to detect a second timing error based on the equalized digital output signal, and to adjust the phase-shift signal based on the second timing error.

15. The apparatus of claim 14, wherein the first timing compensation module further comprises:
- a first timing error detector configured to detect the first timing error;
- a first loop filter configured to generate a first feedback signal based on the first timing error; and
- a first voltage controlled oscillator configured to generate the sampling clock signal based on the first feedback signal to correct the first timing error.

16. The apparatus of claim 14, wherein the first timing error detector is configured to detect the first timing error based on the digital output signal at a zero-crossing when the digital output signal transits from a first polarity to a second polarity.

17. The apparatus of claim 14, wherein the first timing error detector further comprises:
- a zero-crossing detector configured to detect the zero-crossing of the digital output signal;
- a polarity detector configured to detect a slope polarity of the digital output signal at the zero-crossing; and
- a first timing error generator configured to generate the first timing error by combining the digital output signal at the zero-crossing and the slope polarity.

18. The apparatus of claim 14, wherein the second timing compensation module comprises:
- a second timing error detector configured to detect the second timing error based on a difference between the equalized digital output signal and a target output corresponding to a bit sequence of the equalized digital output signal.

19. The apparatus of claim 14, wherein the second timing error detector further comprises:
- a bit detector configured to detect the bit sequence of the equalized digital output signal;
- a target module configured to generate the target output based on the bit sequence; and
- a second timing error generator configured to compute the difference between the equalized digital output signal and the target output.

20. The apparatus of claim 18, wherein:
- the second timing error detector configured to detect the second timing error from the phase-shifted equalized digital output signal;
- a second loop filter configured to generate a second feedback signal based on the second timing error; and
- a second voltage controlled oscillator configured to generate a phase-shift signal based on the second feedback signal.

* * * * *